United States Patent
Steen

[15] 3,656,902
[45] Apr. 18, 1972

[54] METHOD FOR TREATING A BROKEN-AWAY REFRACTORY LINING OF A METALLURGICAL FURNACE, CONSISTING OF DOLOMITE BRICKS

[72] Inventor: Adam Steen, 52, Spoellaan, Heemskerk, Netherlands

[22] Filed: Nov. 22, 1968

[21] Appl. No.: 778,171

[30] Foreign Application Priority Data

Nov. 25, 1967 Germany.....................P 15 83 267.4

[52] U.S. Cl.......................................23/188, 241/15, 75/5, 241/1, 23/284, 23/260
[51] Int. Cl......................C01f 5/16, C01f 11/02, C22b 1/16
[58] Field of Search..........................................23/188; 75/5

[56] References Cited

UNITED STATES PATENTS 1,284,505 11/1918 Warner et al.............................23/188
1,565,107 12/1925 Rich.........................................23/188

FOREIGN PATENTS OR APPLICATIONS 16,412 6/1903 Great Britain...........................23/188

Primary Examiner—M. Weissman
Attorney—Hall & Houghton

[57] ABSTRACT

The broken-away worn out dolomite brick lining of metallurgical furnaces, together with the metal and clinker residues therein, are processed to recover useful substances therefrom by treating the broken lining in a hot condition with a quantity of water as liquid or steam or both, sufficient to enable the broken linings to actually absorb by weight from 10 to 20 parts of water per 100 parts of dolomite brick, said sufficient quantity being not more than 45 parts of water per 100 parts of dolomite brick, by weight, and the reaction being carried out at elevated temperature. This processing causes the brick to fall apart in a short time into a dry powder mass with the coarser steel and clinker residue parts present therein. After an hour's wait, the powder is separated by suction from the metal and clinker residues which remain behind, air preferably being injected into the mass to fluidize the powder during this operation. The recovered dolomite powder may be supplied to a sintering plant for fine ore. Apparatus for facilitating the process is also disclosed.

10 Claims, 1 Drawing Figure

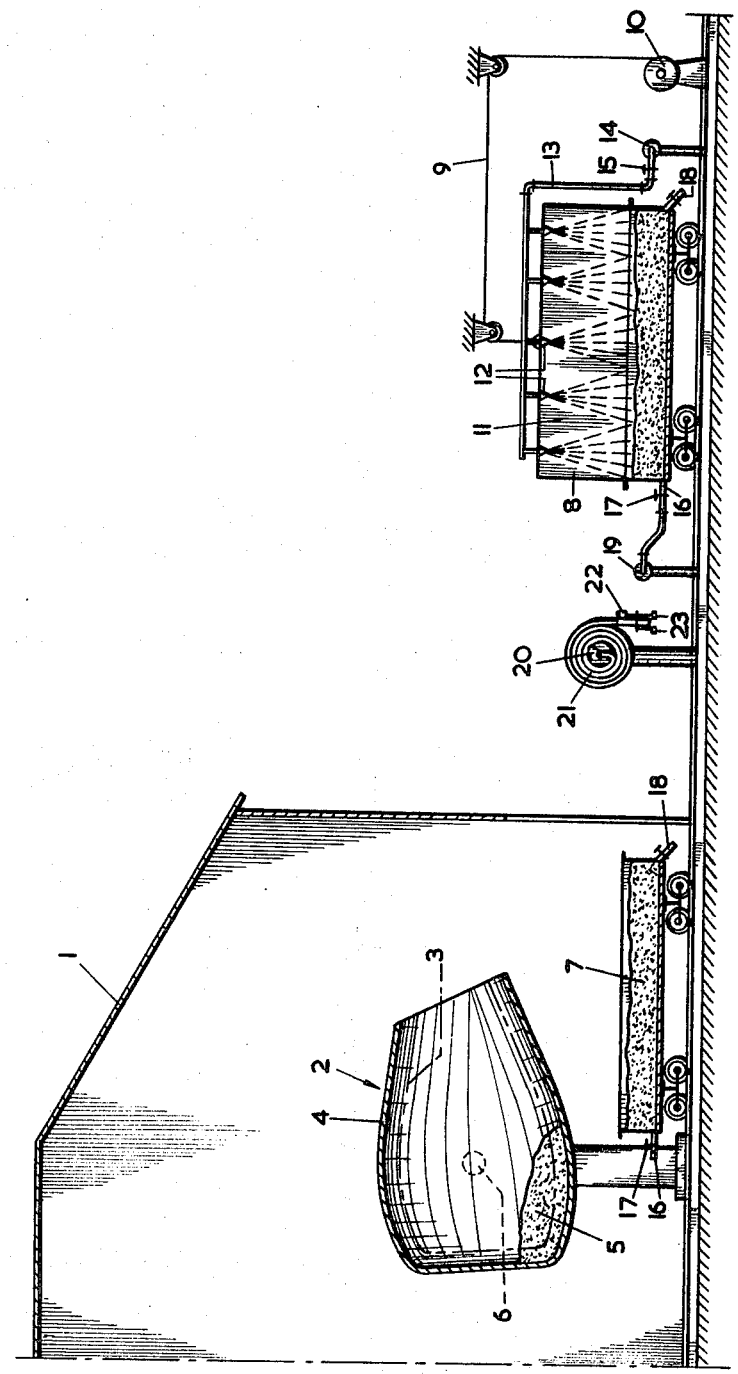

METHOD FOR TREATING A BROKEN-AWAY REFRACTORY LINING OF A METALLURGICAL FURNACE, CONSISTING OF DOLOMITE BRICKS

This invention relates to a method for treating a broken-away refractory lining of a metallurgical furnace, consisting of dolomite bricks, and to a device for applying this method.

Dolomite bricks are often used as refractory lining of metallurgical furnaces. For instance so-called converters for the oxygen blast steel-making process (L.D.-process) are lined with dolomite bricks, which contain for instance about 58 percent calcium oxide and 38 percent magnesium oxide and a few percents of impurities such as oxides from silicon, aluminum and iron, in which the oxides are bound by a binder such as tar. After a certain number of charges in the furnace such a lining becomes worn out to such an extent that it has to be replaced. Thus in this stage the bricks are broken-away in hot or cold condition and become available as detritus (stone pieces or rubble), mixed with steel and clinker parts. Usually these detritus are discharged to waste and if desired, if the detritus are for some reason too hot to be loaded, conveyed or dumped in nature, extinguished with water. This entrains costs for the conveying etc. and difficulties with respect to the space necessary for dumping the detrites.

The present invention is first of all based upon the idea that in the said detritus there are useful substances which could be used to advantage. Of course there is the possibility to break and grind the detritus; but this requires, also by the presence of steel and clinker parts, very heavy stone breaking devices and an expensive sieve system. Moreover a stone-breaker will not be able to loosen metal parts and stone parts mutually to a substantial degree, so that a magnetic separation after this breaking has little effect. Thus it would be necessary, before breaking to small dimensions, to remove the parts with a considerable quantity of metal and clinker by personnel checking the material visually and removing the concerning parts by hand. If the ground product obtained in this way were to be used for making new dolomite bricks the quality of the bricks thus obtained might not be very good, although this point has not yet been sufficiently elucidated.

It has surprisingly been disclosed by this invention that it is possible to have the broken bricks fall apart in a short time period, for instance in 1 or 2 hours, into a dry powder mass of rather uniform grain size with coarser steel and clinker residue parts present therein, and that this can be obtained when the broken brick is treated with a rather exactly predetermined quantity of water or steam. This is according to the invention obtained by performing a method as given in the preamble in such a way that the broken lining (detritus or stone rubble) is contacted with water when this broken line is still in hot condition, and or is brought into contact with steam, water and or steam being used in such a quantity that the quantity thereof actually absorbed by the broken stones is from 100–200 kg. per ton (1,000 kg.) of dolomite bricks, i.e. 10–20 weight parts per 100, and, in case of steam being allowed to escape, in an excess quantity inview of evaporation such that the total quantity of water and or steam supplied is never more than 450 kg. per ton by weight of dolomite bricks. In case of much loss of unused water or steam a somewhat higher quantity may of course be used, provided the quantity which comes into contact with the bricks more or less intimately is below the given limit.

When treating the bricks in a space which is fully closed, where all the steam generated remains in contact with the bricks, such an excess is not necessary and in such a case it is sufficient to use 100–200 kg. of water or steam in total per 1,000 kg. ton of dolomite bricks.

It is known that so-called sinterdolomite is sensitive to moisture by the presence of calcium oxide, so that bricks formed therefrom are not resistant when stored in moist air. This is due to a very slow taking-up of moisture. Also for this reason in the manufacture of the bricks it is usual to use a binder such as tar. This binder leaves behind a coke skeleton when using the bricks in a metallurgical furnace.

Preferably the process according to the invention is embodied in such a way that by suction at least 1 hour after the spraying with water or the like the dolomite powder is sucked away, so that it is easily separated from the steel and clinker parts which stay behind. It is preferable in such a method to blow air into the powder during the sucking-off in order to fluidize the powder.

In a preferable embodiment of the method according to the invention first a quantity of water or steam is fed to the broken bricks and thereafter the partly decomposed bricks are sieved and thereafter the coarser fraction (for instance coarser than 3 mm.) is again subjected to a supply of water or steam, if desired after separating the steel and clinker parts which remained. This second treatment is preferably performed in the same treating space, to which the coarser fraction is fed back after the sieving. Also or the coarser fraction it is true that it should react rapidly by its own temperature and/or by the temperature of the steam as will be described in more detail hereafter.

Preferably the dolomite powder obtained according to the invention is fed as an addition to a sinter plant for fine ore, particularly for fine iron ore.

A device for performing the method as described above is according to the invention characterized in that it includes a bed which is stationary or on a movable carriage such as a railway carriage, on which bed the bricks broken out of the metallurgical furnace may be spread, said device having supply means for feeding water and or for feeding steam in exactly metered quantities upon or into these broken bricks.

Preferably this is realized in such a way that a pneumatical conveying device with suction nozzle is applied, which is movable over and into the layer of broken bricks, if desired with additional air or steam entry openings below the surface of the brick layer of fluidize this layer during the suction.

When realizing the invention in practice preferably a carriage, usually the carriage on which the layer of bricks is formed, is moved to a point below the metallurgical furnace and the bricks broken out of this furnace are dumped therein to form a layer of about equal height. When using water the carriage is moved to a position below the feeding device for water.

The water may be sprayed or fed as a more or less coherent water jet.

If desired water and steam may be used together provided their total quantity does not surpass the given limits.

When using steam a number of steam inlets is used, preferably below the top surface of the layer, and in this case the carriage is coupled to a steam supply which blows a predetermined quantity of steam into the broken bricks. It is possible in this case to have the bricks present in a space which is fully or essentially closed for the steam in order to allow a correct and exact metering of the steam or water supply, which could be made difficult in the free atmosphere by escaping steam not operating intimately on the broken bricks.

It is also possible to use a pipe for supplying steam, which is introduced into the bricks. During the treatment with water or steam the volume of the bricks will increase. Also for this reason and in order to obtain a uniform and intense contact of steam or water with the dolomite it is preferable to have the layer of bricks dumped on the car in such a way that the upper surface thereof is plane and is not in the form of for instance a rather steep cone.

Thereafter, after a period of 1 to 2 hours. in which the broken bricks have been able to react with the water or steam, a suction nozzle of a pneumatic conveying device is entered into the bricks and the dolomite, which meanwhile is hydrated and transferred into powder, is sucked away thereby. This operation may be facilitated by additional blowing in of air in the lower part of the layer in such a way that a fluidization is obtained. The dolomite powder can now be sieved and if desired be fed over a magnetic separator to remove metal and clinker residue parts. The courser metal and clinker parts stay behind on the carriage during the suction. The suction nozzle may be provided with a rotating loosening device in order to remove the remaining small amount of coherence (tackiness) in the dolomite powder after the hydrating.

When using water the bricks themselves should have a rather high temperature (for instance of 500° to 600° C., but at least 200° C.) in order to react adequately in a reasonably short time interval. When using steam the brick temperature may be lower although it is preferred that it be at such a height that not all heat has to come from the steam.

The steam temperature may be 143° C. at a pressure of 4 atmospheres before the steam flows from the steam supply nozzle, if the bricks still have a temperature of about 200° C. or higher. When the bricks are cold it is preferable to choose a higher steam temperature as otherwise the reaction will take too much time.

In practice good results have been obtained with 180-240 liters of water per ton (1,000 kg.) of bricks, supplied in a quantity of 3 to 4 liters per minute per ton of bricks, and on the other hand with 300 kg. of steam of the temperature and pressure as given above per ton of bricks, supplied in a quantity of 5 kg. per minute per ton.

As an example the following values can moreover be given about a treatment with recirculation of the coarser particles as described above.

To a layer of 12.97 tons of hot dolomite bricks 3.70 tons of water were supplied in a finely divided condition. After somewhat longer than 1 hour the dolomite brick was sieved, so that all particles coarser than 3 mm. were separated from the finer particles. This coarser fraction showed dolomite particles of 3 to about 8 mm. and also (in this case in small quantity) steel and clinker residue parts. This coarser fraction has a weight of 4.35 tons, which is about one-third of the total weight of the broken bricks. It appeared that, if the brick was weighed, 1.38 tons of water from the total quantity of 3.70 tons of water had been taken up by the dolomite. There was no free water so that 2.3 tons of water had been evaporated.

The coarser fraction was now separated from steel and clinker parts, for instance magnetically or by hand, and again subjected to a treatment with steam or water, preferably by mixing said coarser particles with a quantity of fresh bricks broken away from a lining of a metallurgical converter and yet untreated. If, however, the coarser fraction was polluted considerably it was possible to discharge this coarser fraction as waste in the same way as usual in the past for all the broken out dolomite bricks.

Thus in this example in first instance 3.70 tons of water were supplied to a quantity of 12.97 tons of hot dolomite bricks, which means about 285 kg. of water per ton of dolomite. From this water 1.38 tons were taken up by the bricks, which means on 12.97 tons of dolomite 107 kg. per ton of dolomite. As 12.97 minus 4.35 or 8.64 tons of dolomite were rapidly transferred into very small particles in the first treatment the water quantity per ton of effectively treated dolomite was: total water supply 429 kg. and not evaporated but taken up by the bricks 159 kg. For the coarser particles, if they were treated in the same way again, again substantially the same quantity of water or steam per ton of dolomite bricks was necessary.

The attached drawing shows diagrammatically a device for performing the method of the invention.

In a hall 1 a metallurgical vessel, such as a converter 2 for the oxygen-blast steel making process, has its lining of dolomite bricks, which has to be renovated and which had a shape with an interior boundary represented by line 3, within a metal casing 4, broken out. Part of the rubble is still present at 5 within the converter, which is tilted to a substantially horizontal position around trunnion bearings represented at 6.

A carriage 7, such as a railway carriage, is positioned below the converter and the broken out lining is dumped onto this carriage and distributed thereon to form a layer of substantially the same height throughout. The bricks are, when dumped on this carriage, still at high temperature, e.g., at a temperature of 500° C., due to the last steelmaking process which took place in the converter 2.

The carriage 7 is now moved to a position outside hall 1 and below a bell 8, suspended by cable 9 to hoisting mechanism 10 for lifting and lowering this bell. Bell 8 is then made to fit with its free lower edge all around on the upstanding edges of carriages 7 and forms together with the carriage an almost closed space, which, however, needs not be fully gas or watertight.

In the ceiling of bell 8 are a number of supply orifices 12 for water, fed by a hose 13, which is coupled to a water supply at 14 with a cock or valve 15. One or more spigots 16 with a valve or cock 17 are provided near the bottom of the carriage. A drain 18 with a cock allows water from the bottom of the carriage to be drained.

In the vicinity of the bell 8 there is a connection at 19 for air under pressure and a connection at 20 to an air suction pump. This latter connection is coupled to a hose 21 on a reel and the rigid end tube of the hose carries a small electric motor 22, driving a ring with arms and blades 23 at the ends of said arms, so that the ring can be rotated around the suction nozzle at the end of the hose 21.

Water is supplied through the orifices 12 onto the layer of broken bricks on the carriage in a quantity per time unit and a total quantity as described above. To this end there is a suitable water meter in the connection at 14. After the water has been supplied and has been allowed to hydrate the broken bricks during a sufficiently long time as indicated above the bell 8 is lifted by hoist 10 and cable 9 and after draining water from the bottom through drain 18 air under pressure is supplied through connection 19 to spigots 16. Meanwhile hose 21 is unwound and suction through connection 20 is exerted on the suction nozzle at the end of this hose, electric motor 22 being meanwhile driven to rotate the ring with the blades 23. The suction nozzle with the rotating blades is now moved through the hydrated dolomite on the carriage 7 by personnel standing on the top edge thereof and thus the dolomite powder is sucked in by the nozzle and is thereafter separated from the air by suitable separating means not shown, such as a cyclone dust separator. The air under pressure supplied to spigot(s) 16 blows upwards through the dolomite to fluidize it to facilitate its sucking away by the suction nozzle. The blades 23 overcome possible remaining slight coherence and tackiness between the small dolomite particles.

The water may be sprayed as more or less finely divided sprays by orifices 12, or it may be fed as one or more coherent jets.

It it is desired to pulverize the dolomite bricks by steam this steam may be supplied through spigot(s) 16 by connecting these to a suitable steam supply. If desired the bell 8 in this case, but also if water is used, may have orifices to allow an easy escape of steam or prevent too much condensate water to be formed. It could also be possible to omit bell 8 altogether, but this means more loss of water or steam and, particularly in the case of water, much cooling by the ambient air and so this is only allowable if the temperature of the rubble and the possible heat supply by the steam ensure that the dolomite will not become too cold. If desired both water and steam may be used simultaneously, provided the total quantity thereof does not surpass the quantity limits given above and in the following claims.

If steam is supplied through spigot(s) 16 it is still possible to use the same spigot(s) for the supply of fluidizing air in a later stage of treatment.

What is claimed is:

1. A method of hydrating and finely dividing a broken-away refractory lining of a metallurgical furnace and recovering useful material therefrom, said refractory lining consisting of dolomite firebricks, which method comprises:
    a. breaking up the refractory lining, while still in a hot condition resulting from operation of the metallurgical furnace, into the form of a hot detritus or stone rubble having a temperature in the range of 200° to 600° C.
    b. then forming a layer of said hot rubble on a flat bottom without cooling it below 200° C., c. then contacting the so-formed layer of hot rubble with water supplied thereto in an amount which is less than 45 parts per 100 parts of the dolomite brick therein, until from 10 to 20 weight parts of water per 100 weight parts of brick has actually been taken up by the brick of said layer, the temperature and amount of the water supplied thereto being such as to cause the broken lining to attain and keep a temperature of at least 500° C., d. then shutting off the water supply, and e. subsequently recovering the dolomite powder formed.

2. A method as claimed in claim 1 wherein step (e) is effected, after at least 1 hour has elapsed following the contacting with water of the broken up lining, by sucking off the dolomite powder formed, thus separating such powder from the steel- and -clinker particles which stay behind.

3. A method as claimed in claim 2, wherein air is introduced into the lower zone of said layer during said sucking off to fluidize the dolomite powder formed.

4. A method as claimed in claim 1, wherein the water with which the hot detritus is contacted is supplied in the form of steam.

5. A method as claimed in claim 1, wherein the water with which the hot detritus is contacted is supplied in liquid form.

6. A method as claimed in claim 1, wherein the bricks subjected to procedures (a) and (b) are at a temperature between 500° and 600° C.

7. A method as claimed in claim 1, wherein procedure (c) is practiced by first supplying to said layer only part of the said quantity of water, thereafter separating the resulting dolomite powder from particles coarser than 3 mm. by sieving, and then again subjecting said coarser particles of brick to procedure (c), after first having separated said coarser particles of brick from steel- and-clinker particles therein.

8. A method as claimed in claim 7, wherein said coarser particles separated by the sieving are mixed with a further quantity of detritus prepared by procedure (a) which mixture is then subjected to procedures (b) and (c).

9. A method as claimed in claim 1, in which the dolomite powder recovered in procedure (e) is supplied as an addition to a sinter plant for fine iron ore.

10. A method as claimed in claim 1, wherein the water is supplied in step (c) gradually in a quantity of 2 to 6 kilograms per minute per 1,000 kilograms of broken brick.

* * * * *